Oct. 10, 1933.          J. G. BENTLEY ET AL          1,930,080
PARALLEL PICKER MOTION FOR LOOMS
Filed June 23, 1931          3 Sheets-Sheet 2

J. G. BENTLEY.
R. A. GIBBS JR.
F. O. GIBBS.
AND
G. M. JONES.
INVENTORS.

BY *[signature]*

ATTORNEY.

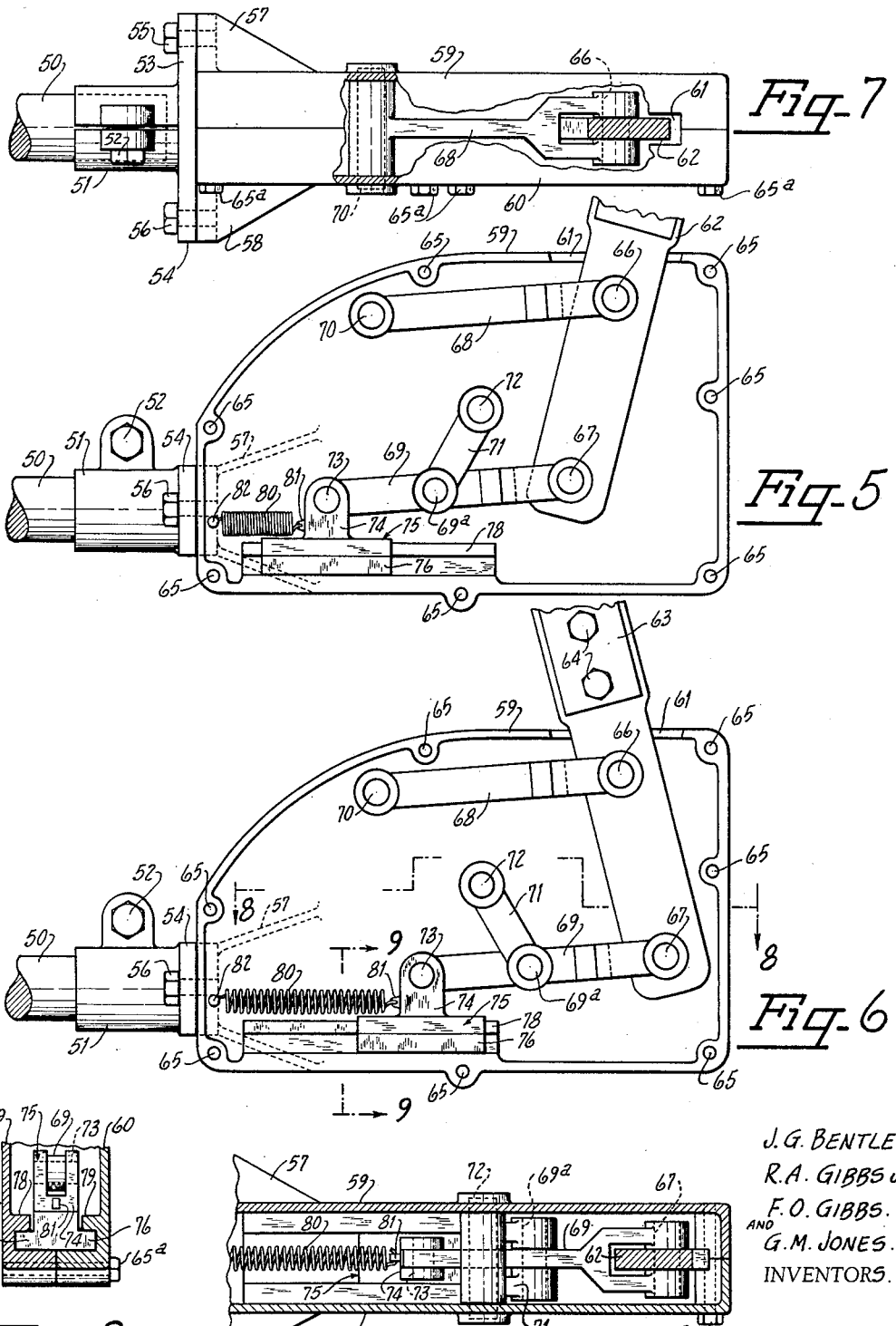

Patented Oct. 10, 1933

1,930,080

UNITED STATES PATENT OFFICE 1,930,080

PARALLEL PICKER MOTION FOR LOOMS

John G. Bentley, Robert A. Gibbs, Jr., Francis O. Gibbs, and Gaither M. Jones, Greensboro, N. C.

Application June 23, 1931. Serial No. 546,394

7 Claims. (Cl. 139—149)

This invention relates to means for imparting a parallel motion to the picker located on the free end of a picker stick in looms for arresting the motion of the shuttle after it is thrown into the box and for throwing the shuttle thru the race to the other end of the box.

Heretofore, the conventional type of picker stick is mounted at its lower end of a shoe or other structure which invariably gives an arcuate path of travel to the picker located on the free end of the picker stick. Various attempts have been made to provide a parallel motion to the picker for throwing the shuttle, but we have provided means whereby a sturdy mechanism is provided for imparting to the picker stick a motion which will cause the picker to travel in a straight line, and therefore, to throw the shuttle in a straight line.

It is a well known fact that when the picker is moved in an arcuate line that an arcuate throw will be given to the shuttle causing pick-outs and other imperfections in the cloth, and it is an object of this invention to provide a mechanism which will cause the picker on the upper end of the picker stick to travel in a straight line at all times in the throwing of the shuttle and the receiving of the shuttle after it is thrown from the other end of the lay of the loom.

Some of the objects of the invention having been stated, other objects will appear as the description proceeds when taken in connection with the accompanying drawings, in which—

Figure 4 is a longitudinal view taken along the line 4—4 in Figure 2;

Figure 5 is a view of a modified form of means for imparting parallel motion to a picker showing the picker stick in outward position;

Figure 6 is a view similar to Figure 5, but showing the picker stick in inward position;

Figure 7 is a top plan view of Figure 5 with parts broken away for sake of clearness;

Figure 8 is a longitudinal view taken along the line 8—8 in Figure 6;

Figure 9 is a cross sectional view taken along the line 9—9 in Figure 6.

Figure 1:
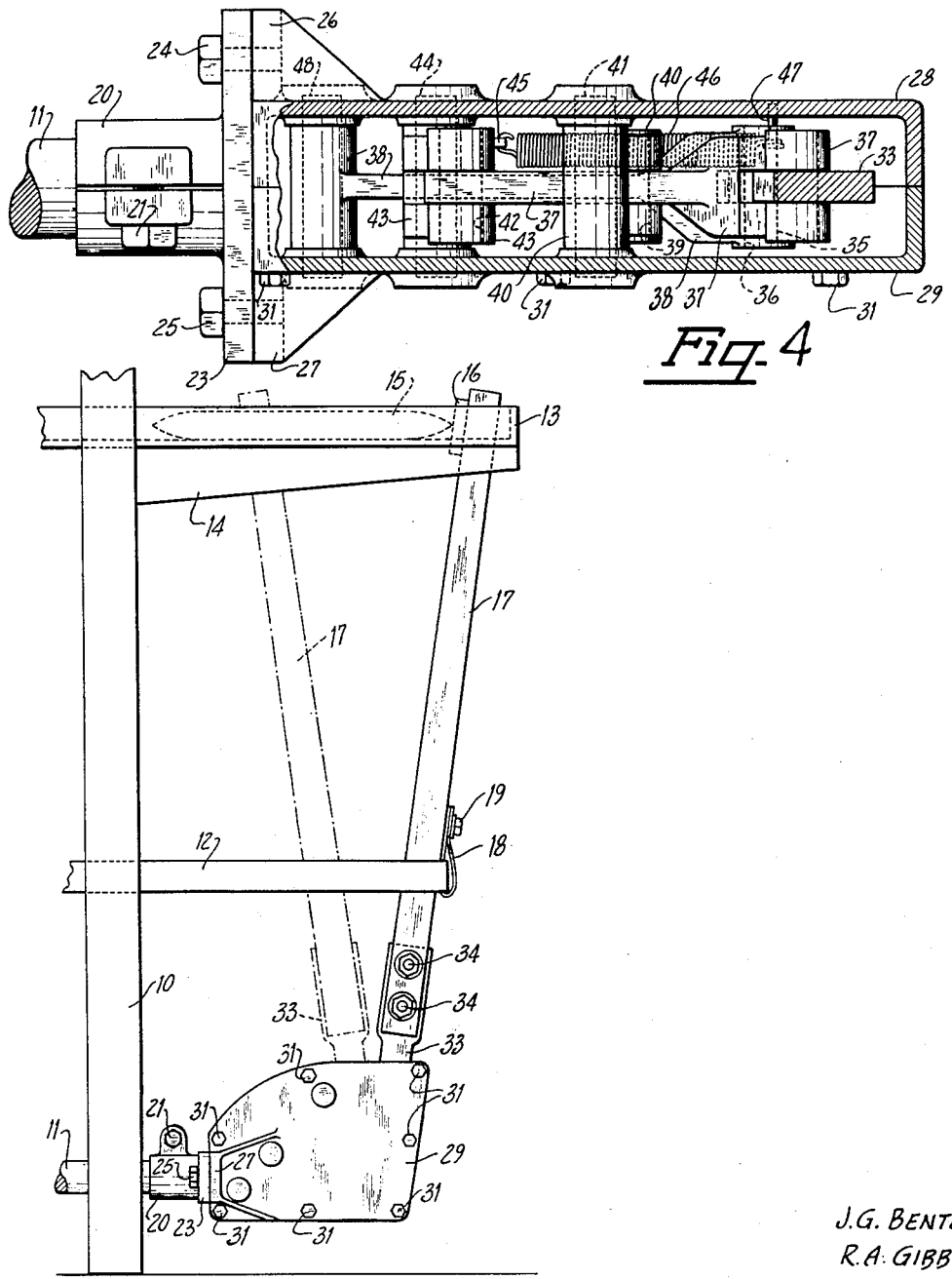
Figure 1 is a side elevation showing the assembled means for imparting parallel motion to the picker stick.

Referring more specifically to the drawings, the numeral 10 indicates the framework of the loom having the conventional rocker shaft 11 and the lug strap 12 and the box 13 of the lay 14 in which a shuttle 15 finds lodgement at the end of its throw against a picker 16 located on the upper end of picker stick 17, said picker stick having a lug strap support 18 secured by any suitable means such as a screw 19 for holding the lug strap in position.

The above parts are conventional and are adapted to be associated with the invention, which invention is shown comprising a bracket 20 secured on the end of rocker shaft 11 by means of a screw 21, said bracket having laterally projecting portions 22 and 23 in which screws 24 and 25 are mounted which screws are secured in projections 26 and 27 which occur on the housing 28 and the cover plate 29 therefor. Housing 28 has enlargements around the edge thereof in which holes 30 occur by means of which the cover plate 29 is secured by means of screws 31. The housing 28 and cover plate 29 are of approximately equal depth, and on their proximate surfaces have a slot 32 in which member 33 moves and to which picker stick is secured by means of bolts 34, and this member 33 is pivotally connected as at 35 and 36 to links 37 and 38 respectively, said links being forked at the ends at which they are connected to the member 33 to engage both sides of member 33. Link 37 has pivotally secured thereto as at 39 a link 40 which has its other end pivotally secured on a stud bolt 41 mounted in portion 28 of the casing.

The other end of link 37 is secured as at 42 to a link 43 which is pivotally mounted on stud bolt 44 which is fixedly secured in the portion 28 of the casing. Link 43 has a projection 45 thereon to which is secured a tension spring 46, the other end of said tension spring being secured as at 47 to the lower end of member 33, the purpose of this spring being to return the picker stick to the position shown in Figure 1 and to return the parts to the position shown in Figure 2 within the casing.

Pivotally secured on stud bolt 48 is the other end of link 38 which stud bolt 48 is mounted in portion 28 of the casing.

The links 38, 37 and 43 have enlargements or hub portions at the point where they are pivoted on the stud bolts 48, 42 and 44 respectively which form a working fit between the interior of the portions 28 and 29 of the casing.

Figure 2:
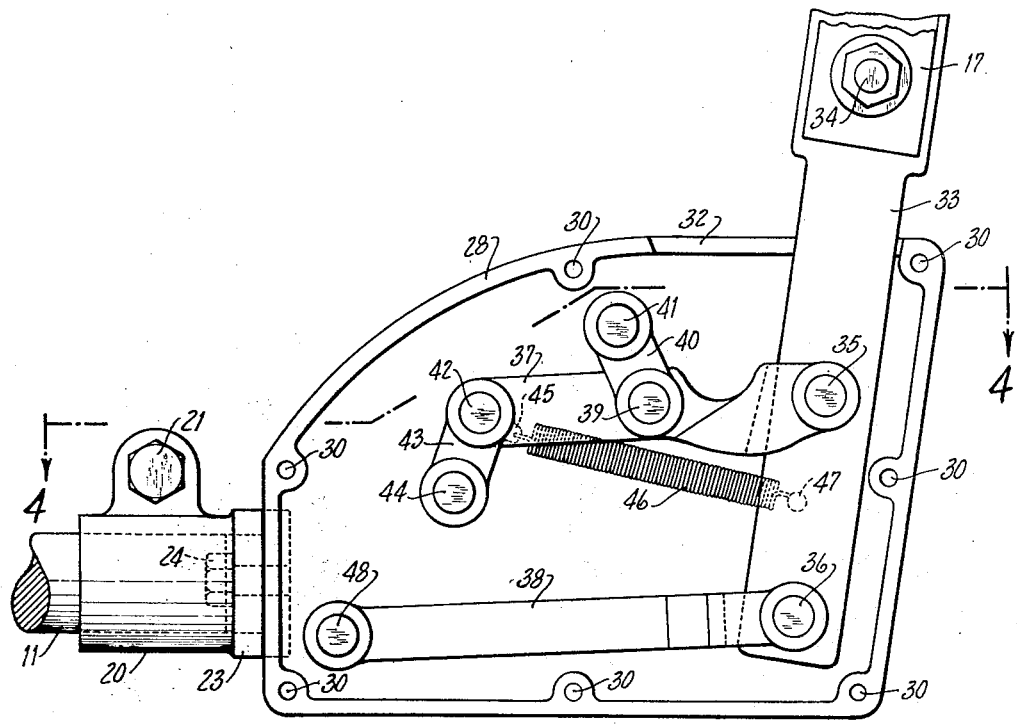
Figure 2 is a view showing the parts with the picker stick in outward position.
Figure 3:
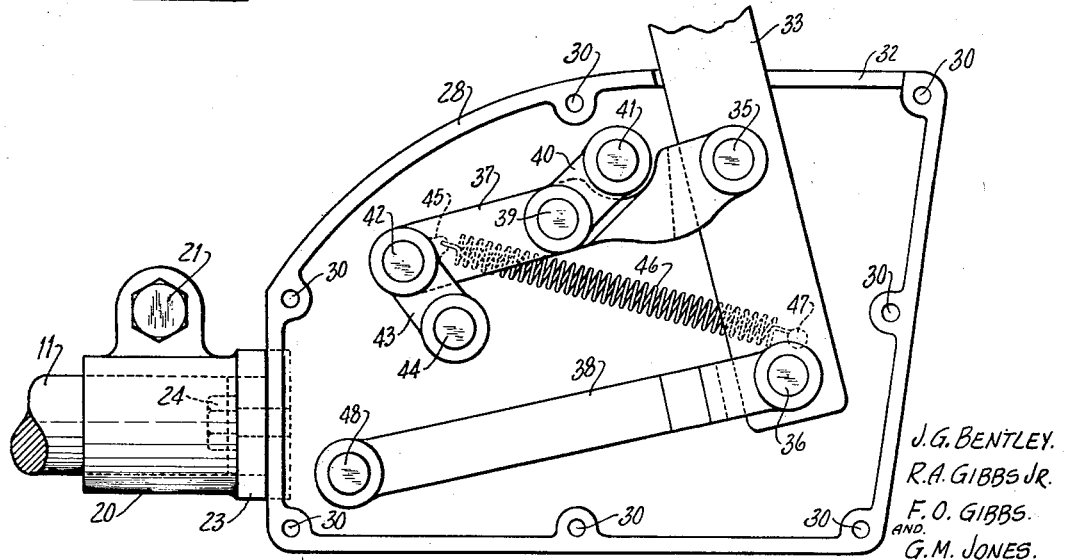
Figure 3 is a view similar to Figure 2 but showing the parts with the picker stick in inward position.

The stud bolts 41, 44 and 48 have both of their ends mounted respectively in the portions 28 and 29 of the casing, and the fit into the portion 28 is a tight fit, whereas the fit into the removable portion 29 is a loose fit to permit removal of cover portion 29 without removing any of the working parts from the portion 28 as they will remain mounted in the position shown in Figures 2 and 3.

By the arrangement shown in Figures 1 to 4 inclusive it is seen that the picker 16 is moved in a horizontal direction at all times due to the peculiar action of the plurality of pivoted links mounted in the casing as previously described.

In Figures 5 to 9 inclusive, there is shown a modified form of the invention in which the crank shaft is indicated by reference character 50 having the split cuff 51 secured thereon by means of screw 52, said split cuff 51 having laterally projecting portions 53 and 54 in which screws 55 and 56 are mounted which threadably engage projections 57 and 58 on the portions 59 and 60 forming a casing for the working parts to be presently described.

This casing is cut away at its proximate edges forming a slot 61 thru which member 62 operating the picker stick 63 projects, which stick is secured thereto by means of bolts 64.

Portion 59 has enlargements along the periphery thereof in which holes 65 are provided and threaded interiorly for the reception of bolts 65a for securing the two parts of the casing together.

Member 62 has pivotally secured thereto as at 66 and 67 the forked links 68 and 69, link 68 at its other end being pivotally secured on a bolt 70 having one end thereof fixedly secured in portion 59 of the casing and being adapted to project into a bearing portion in the interior surface of portion 60 of the casing. Link 69 is pivotally secured intermediate its ends as at 69a to a forked link 71, the other end of said link 71 being secured on a stud bolt 72 which has one end thereof fixedly secured in portion 59 of the casing and the other end thereof being adapted to project into a suitable cavity allowing a sliding fit in the portion 60 of the casing. Link 69 is pivotally connected as at 73 in an upstanding projection 74 which is integral with a slide 75 which has the laterally projecting portions 76 and 77 extending beneath longitudinally disposed projections 78 and 79 on the interior surfaces of portions 59 and 60 of the casing. Projection 74 has thereon means for securing a tension spring 80 as at 81 and the other end of this spring is secured as at 82 to portion 59 of the casing, the purpose of the tension spring being to return the picker stick to outward position.

In the drawings and specification there has been set forth a preferred embodiment of the invention and although specific terms are employed, they are used in a generic and descriptive sense only and not for purposes of limitation, the scope of the invention being set forth in the appended claims.

1. Means for mounting a picker stick for looms to cause the upper end of the stick to move in a straight line, comprising a lubricant container, means for securing the container to the rocker shaft of the loom, a member projecting from the casing to which the picker stick is secured, a pair of pivoted links in the casing pivotally connected at one end to the member to which the picker stick is secured, the other end of one of said links being pivotally secured to a fixed pivot on the inside of the casing, and the other end of the other of said links being pivotally secured to a movable member mounted inside the casing.

2. Means for maunting a picker stick for looms to cause the picker thereon to move in a line parallel to the cloth in the loom comprising a lubricant holding casing, means for securing the casing to the rocker shaft of the loom, said casing having a slot in the upper surface thereof, a member adapted to have movement in said slot, means for securing the lower end of the picker stick to said member, a pair of links pivoted at one end to said member, means for pivotally securing the other ends of said links in said casing the other end of one of said links being pivotally secured to a fixed pivot on the inside of the casing, and the other end of the other of said links being pivotally secured to a movable member mounted inside the casing.

3. Means for supporting a picker stick in a loom comprising a casing and means for securing the same to the rocker shaft of a loom, said casing having a slot in the upper edge thereof, a picker stick support adapted to have movement in said slot, a pair of links pivotally secured to the picker stick support, and means for pivotally securing the other ends of said links within the casing the other end of one of said links being pivotally secured to a fixed pivot on the inside of the casing, and the other end of the other of said links being pivotally secured to a movable member mounted inside the casing.

4. In a parallel picker stick motion in combination with means for imparting movement to the picker stick, a casing and means for securing the same to the rocker shaft of the loom, a movable member in said casing and projecting therefrom; means for securing the picker stick to the upper end of said movable member, a pair of links pivotally secured to said movable member and having their other ends so secured in the casing to cause the picker end of the stick to travel in a straight line throughout its throw the other end of one of said links being pivotally secured to a fixed pivot on the inside of the casing, and the other end of the other of said links being pivotally secured to a movable member mounted inside the casing.

5. In a parallel picker stick motion in combination, a casing having a slot in the upper portion thereof, a swinging member adapted to have movement in said slot, means for securing the picker stick to said swinging member, a link pivotally connected to said swinging member intermediate the ends thereof, a pivotally mounted second link pivotally secured to the other end of said link, a pivotally mounted third link pivotally secured to the first link intermediate the ends of the first link, a fourth link pivotally secured to the lower end of said swinging member and means for pivotally mounting the other end of said fourth length.

6. In a parallel picker stick motion, in combination a casing having a slot therein, a swinging member adapted to have movement in said slot, means for securing the picker stick to said member, a link pivotally secured at one end to an intermediate portion of the swinging member and having its other end pivotally secured to the casing, a member slidably mounted in said casing, a second link having one of its ends pivotally secured to the swinging member and having its other end pivotally secured to the swinging member.

7. In a parallel picker stick motion, in combination a casing having a slot therein, a swinging member adapted to have movement in said slot, means for securing the picker stick to said member, a link pivotally secured at one end to an intermediate portion of the swinging member and having its other end pivotally secured to the casing, a member slidably mounted in said casing, a second link having one of its ends pivotally secured to the swinging member and having its other end pivotally secured to the swinging member, and a third link having one of its ends pivotally secured to an intermediate portion of the second link and having its other end secured to the casing.

JOHN G. BENTLEY.
ROBERT A. GIBBS, Jr.
FRANCIS O. GIBBS.
GAITHER M. JONES.